US007092979B1

(12) United States Patent
Shim (10) Patent No.: US 7,092,979 B1
(45) Date of Patent: Aug. 15, 2006

(54) RANDOM DATA GENERATOR AND SCRAMBLER USING THE SAME, AND METHOD THEREFORE

(75) Inventor: Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 09/613,310

(22) Filed: Jul. 10, 2000

(30) Foreign Application Priority Data

Jul. 10, 1999 (KR) ................................ 1999-27886

(51) Int. Cl.
*G06F 1/20* (2006.01)
(52) U.S. Cl. ...................................... 708/250; 708/252
(58) Field of Classification Search ................ 708/250, 708/252, 253, 254, 255, 256
See application file for complete search history.

(56) References Cited

U.S. PATENT DOCUMENTS

| 4,974,184 | A | * | 11/1990 | Avra ........................... 708/252 |
| 5,090,035 | A | | 2/1992 | Murase |
| 5,258,936 | A | | 11/1993 | Gallup et al. |
| 5,331,581 | A | * | 7/1994 | Ohkubo et al. ............. 708/253 |
| 5,631,962 | A | | 5/1997 | Balph et al. |
| 5,638,309 | A | * | 6/1997 | Negi ........................... 708/250 |
| 5,867,409 | A | * | 2/1999 | Nozuyama .................. 708/252 |

FOREIGN PATENT DOCUMENTS

| EP | 0 372 226 | 11/1989 |
| EP | 0 438 322 | 7/1991 |
| EP | 0 635 956 | 7/1994 |
| EP | 2 291 234 | 1/1996 |
| EP | 0 794 496 | 6/1996 |
| JP | 4-54720 | 2/1992 |
| JP | 6-37603 | 2/1994 |
| JP | 6-37603 A | 2/1994 |
| JP | 6-225260 | 8/1994 |
| JP | 7-134647 | 5/1995 |
| JP | 11-275052 | 8/1999 |

OTHER PUBLICATIONS

O'Reilly, John J., "Series-Parallel Generation of M-Sequences," Radio and Electronic Engineer, vol. 45, No. 4, Apr. 1975, pp. 171-176.

* cited by examiner

*Primary Examiner*—Chuong D. Ngo
(74) *Attorney, Agent, or Firm*—Stein, McEwen & Bui, LLP (57) ABSTRACT

A random data generating apparatus which receives m bits, including: a first random data generator having: an $m \times 2^m$ decoder which receives the m bits and outputs n bits; registers arranged in series which shift and store the n bits, to generate shifted n bits; selection output circuits which receive the n bits from the $m \times 2m$ decoder as selection signals, and provide a predetermined value with respect to valid bits among the n bits output from the $m \times 2m$ decoder and provide the shifted n bits output from the registers with respect to invalid bits among the n bits output from the $m \times 2^m$ decoder, to generate selected n bits; and logic circuits which perform XOR operations on the selected n bits from the selection output circuits and respective ones of the shifted n bits output from the registers, and feed the results of the XOR operations back to a least significant one of the registers only in a case of valid bits among the n bits of output from the $m \times 2^m$ decoder. The registers generate the shifted n bits as random data.

19 Claims, 13 Drawing Sheets

| NO | RANDOM DATA RESULTS ($r_{14} \sim r_0$) | SCRAMBLING RESULTS ($D_{07} \sim D_{00}$) | NO | RANDOM DATA RESULTS ($r_{14} \sim r_0$) | SCRAMBLING RESULTS ($D_{07} \sim D_{00}$) |
|---|---|---|---|---|---|
| 1 | 0001h | 01h | 32766 | 4888h | 88h |
| 2 | 0100h | 00h | 32767 | 0880h | 80h |
| 3 | 0022h | 22h | 32768 | 0001h | 01h |
| 4 | 2204h | 04h | 32769 | 0100h | 00h |
| 5 | 0404h | 04h | 32770 | 0022h | 22h |
| 6 | 0488h | 88h | 32771 | 2204h | 04h |
| 7 | 0898h | 98h | 32772 | 0404h | 04h |
| 8 | 1802h | 02h | 32773 | 0488h | 88h |
| 9 | 0230h | 30h | 32774 | 0898h | 98h |
| ~ | ~ | ~ | | | |

FIG. 3
PRIOR ART

| ID(7:4) | INITIAL VALUE | ID(7:4) | INITIAL VALUE |
|---|---|---|---|
| 0h | 0001h | 8h | 0010h |
| 1h | 5500h | 9h | 5000h |
| 2h | 0002h | Ah | 0020h |
| 3h | 2A00h | Bh | 2001h |
| 4h | 0004h | Ch | 0040h |
| 5h | 5400h | Dh | 4002h |
| 6h | 0008h | Eh | 0080h |
| 7h | 2800h | Fh | 0005h |

| INPUT(3 BITS) | OUTPUT ($D_{o15} \sim D_{o0}$) |
|---|---|
| 000b | 810Ah |
| 001b | 8805h |
| 010b | 80D0h |
| 011b | 8821h |
| 100b | CA00h |
| 101b | D008h |
| 110b | A840h |
| 111b | B400h |

FIG. 8

| NO | RANDOM DATA RESULTS ($r_{15} \sim r_0$) | SCRAMBLING RESULTS ($D_{o7} \sim D_{o0}$) | NO | RANDOM DATA RESULTS ($r_{15} \sim r_0$) | SCRAMBLING RESULTS ($D_{o7} \sim D_{o0}$) |
|---|---|---|---|---|---|
| 1 | 0001h | 01h | ~ | ~ | ~ |
| 2 | 0100h | 00h | 65534 | ACEFh | EFh |
| 3 | 0053h | 53h | 65535 | EF00h | 00h |
| 4 | 5311h | 11h | 65536 | 0001h | 01h |
| 5 | 1100h | 00h | 65537 | 0100h | 00h |
| 6 | 0063h | 63h | 65538 | 0053h | 53h |
| 7 | 631Eh | 1Eh | 65539 | 5311h | 11h |
| 8 | 1E53h | 53h | 65540 | 1100h | 00h |
| 9 | 5353h | 53h | 65541 | 0063h | 63h |
| ~ | ~ | ~ | 65542 | 631Eh | 1Eh |

| NO | BRANCH VALUE ($D_{015} \sim D_{00}$) | NO | BRANCH VALUE ($D_{015} \sim D_{00}$) |
|---|---|---|---|
| 1 | 8016h | 27 | 8940h |
| 2 | 801Ch | 28 | 8A04h |
| 3 | 8029h | 29 | 9028h |
| 4 | 80D0h | 30 | 9082h |
| 5 | 810Ah | 31 | 9120h |
| 6 | 810Ch | 32 | 9420h |
| 7 | 8112h | 33 | 9840h |
| 8 | 8142h | 34 | 9C00h |
| 9 | 8148h | 35 | A084h |
| 10 | 8150h | 36 | A101h |
| 11 | 8214H | 37 | A108h |
| 12 | 8241H | 38 | A140h |
| 13 | 8244H | 39 | A440h |
| 14 | 8248H | 40 | A801h |
| 15 | 8260H | 41 | A840h |
| 16 | 8320H | 42 | B010h |
| 17 | 8406H | 43 | B400h |
| 18 | 8430H | 44 | C009h |
| 19 | 8540H | 45 | C00Ah |
| 20 | 8580H | 46 | C042h |
| 21 | 8610H | 47 | C108h |
| 22 | 8805H | 48 | C120h |
| 23 | 8821H | 49 | C208h |
| 24 | 8841H | 50 | C801h |
| 25 | 8842H | 51 | CA00h |
| 26 | 8920H | 52 | D008h |

FIG. 10

| NO | branch value ($D_{o15}$–$D_{o0}$) | NO | branch value ($D_{o15}$–$D_{o0}$) | NO | branch value ($D_{o15}$–$D_{o0}$) | NO | branch value ($D_{o15}$–$D_{o0}$) | NO | branch value ($D_{o15}$–$D_{o0}$) | NO | branch value ($D_{o15}$–$D_{o0}$) |
|---|---|---|---|---|---|---|---|---|---|---|---|
| 1 | 801Fh | 63 | 805Eh | 125 | 8068h | 186 | 8097h | 247 | 809Eh | 248 | 80A7h |
| 2 | 80AEh | 64 | 80C8h | 126 | 8006h | 187 | 80E3h | 248 | 8117h | 249 | 812Eh |
| 3 | 8136h | 65 | 8172h | 127 | 818Eh | 188 | 81A5h | 249 | 81B4h | 250 | 81B8h |
| 4 | 81C3h | 66 | 81C6h | 128 | 8101h | 189 | 8228h | 250 | 8233h | 251 | 8299h |
| 5 | 82A3h | 67 | 82B4h | 129 | 82C3h | 190 | 82E1h | 251 | 8325h | 252 | 8329h |
| 6 | 8345h | 68 | 8361h | 130 | 83C1h | 191 | 846Ah | 252 | 8471h | 253 | 8478h |
| 7 | 849Ch | 69 | 84C5h | 131 | 8402h | 192 | 84E1h | 253 | 84E2h | 254 | 8562h |
| 8 | 8589h | 70 | 858Ah | 132 | 85A8h | 193 | 8607h | 254 | 860Eh | 255 | 8634h |
| 9 | 8638h | 71 | 8646h | 133 | 864Ah | 194 | 8651h | 255 | 86A1h | 256 | 86C1h |
| 10 | 8722h | 72 | 8742h | 134 | 8782h | 195 | 8784h | 256 | 8827h | 257 | 882Eh |
| 11 | 8848h | 73 | 888Eh | 135 | 88E4h | 196 | 8929h | 257 | 8931h | 258 | 8945h |
| 12 | 8962h | 74 | 8A00h | 136 | 8A26h | 197 | 8A43h | 258 | 8A49h | 259 | 8A64h |
| 13 | 8A68h | 75 | 8A83h | 137 | 8AD0h | 198 | 8821h | 259 | 8B28h | 260 | 8C46h |
| 14 | 8C49h | 76 | 8C54h | 138 | 8C91h | 199 | 8C92h | 260 | 8D03h | 261 | 8D44h |
| 15 | 8D84h | 77 | 8E14h | 139 | 8E30h | 200 | 8E42h | 261 | 8EC0h | 262 | 8F10h |
| 16 | 901Eh | 78 | 9047h | 140 | 9040h | 201 | 905Ch | 262 | 9063h | 263 | 90C3h |
| 17 | 90CAh | 79 | 90D4h | 141 | 90D8h | 202 | 90F0h | 263 | 9113h | 264 | 911Ah |
| 18 | 9129h | 80 | 9145h | 142 | 9149h | 203 | 9158h | 264 | 9194h | 265 | 91A2h |
| 19 | 9207h | 81 | 9216h | 143 | 921Ch | 204 | 9225h | 265 | 924Ch | 266 | 928Ah |
| 20 | 9303h | 82 | 930Ah | 144 | 9311h | 205 | 9328h | 266 | 9341h | 267 | 9388h |
| 21 | 940Eh | 83 | 9438h | 145 | 9454h | 206 | 9462h | 267 | 9485h | 268 | 948Ch |
| 22 | 94A1h | 84 | 94A2h | 146 | 94C1h | 207 | 94C4h | 268 | 9512h | 269 | 9514h |
| 23 | 9518h | 85 | 9542h | 147 | 9584h | 208 | 9630h | 269 | 96A0h | 270 | 96C0h |
| 24 | 980Bh | 86 | 9813h | 148 | 9861h | 209 | 9883h | 270 | 9886h | 271 | 9894h |
| 25 | 9924h | 87 | 9982h | 149 | 9A0Ah | 210 | 9A12h | 271 | 9A82h | 272 | 9C06h |
| 26 | 9C24h | 88 | 9C90h | 150 | 9D04h | 211 | A03Ah | 272 | A04Eh | 273 | A066h |
| 27 | A0A5h | 89 | A0A9h | 151 | A0ACh | 212 | A0C9h | 273 | A0CCh | 274 | A0F0h |
| 28 | A125h | 90 | A138h | 152 | A154h | 213 | A170h | 274 | A185h | 275 | A1A1h |
| 29 | A1C1h | 91 | A207h | 153 | A223h | 214 | A24Ah | 275 | A251h | 276 | A262h |
| 30 | A270h | 92 | A285h | 154 | A294h | 215 | A2C4h | 276 | A314h | 277 | A322h |
| 31 | A348h | 93 | A350h | 155 | A390h | 216 | A40Eh | 277 | A41Ah | 278 | A42Ch |
| 32 | A454h | 94 | A461h | 156 | A485h | 217 | A48Ah | 278 | A498h | 279 | A509h |
| 33 | A50Ah | 95 | A590h | 157 | A740h | 218 | A807h | 279 | A82Ch | 280 | A852h |
| 34 | A864h | 96 | A883h | 158 | A892h | 219 | A8A4h | 280 | A8D0h | 281 | A905h |
| 35 | A922h | 97 | A930h | 159 | A984h | 220 | AA41h | 281 | AB10h | 282 | AC03h |
| 36 | AC12h | 98 | AC44h | 160 | AE02h | 221 | B01Ch | 282 | B031h | 283 | B085h |
| 37 | B08Ch | 99 | B0A1h | 161 | B109h | 222 | B118h | 283 | B130h | 284 | B1C0h |
| 38 | B203h | 100 | B221h | 162 | B228h | 223 | B302h | 284 | B405h | 285 | B424h |
| 39 | B580h | 101 | B601h | 163 | B640h | 224 | B812h | 285 | B814h | 286 | B830h |
| 40 | B888h | 102 | B8C0h | 164 | B902h | 225 | BA08h | 286 | BA40h | 287 | BA80h |
| 41 | BC04h | 103 | BC80h | 165 | BD00h | 226 | C036h | 287 | C08Bh | 288 | C095h |
| 42 | C10Dh | 104 | C12Ah | 166 | C145h | 227 | C149h | 288 | C164h | 289 | C183h |
| 43 | C194h | 105 | C1B0h | 167 | C1C2h | 228 | C1E0h | 289 | C200h | 290 | C219h |
| 44 | C226h | 106 | C268h | 168 | C286h | 229 | C289h | 290 | C294h | 291 | C2B0h |
| 45 | C2C2h | 107 | C305h | 169 | C30Ch | 230 | C312h | 291 | C360h | 292 | C390h |
| 46 | C3A0h | 108 | C419h | 170 | C431h | 231 | C464h | 292 | C498h | 293 | C522h |
| 47 | C530h | 109 | C5C0h | 171 | C606h | 232 | C611h | 293 | C648h | 294 | C710h |
| 48 | C807h | 110 | C80Dh | 172 | C813h | 233 | C823h | 294 | C846h | 295 | C852h |
| 49 | C8A1h | 111 | C8D0h | 173 | C918h | 234 | C928h | 295 | C941h | 296 | C944h |
| 50 | C982h | 112 | CA44h | 174 | CA48h | 235 | CA60h | 296 | CA82h | 297 | CC05h |
| 51 | CC11h | 113 | CC21h | 175 | CCA0h | 236 | D016h | 297 | D019h | 298 | D04Ah |
| 52 | D061h | 114 | D083h | 176 | D086h | 237 | D092h | 298 | D094h | 299 | D0A2h |
| 53 | D0C2h | 115 | D141h | 177 | D144h | 238 | D148h | 299 | D160h | 300 | D190h |
| 54 | D224h | 116 | D242h | 178 | D260h | 239 | D282h | 300 | D2C0h | 301 | D481h |
| 55 | D809h | 117 | D821h | 179 | D828h | 240 | D841h | 301 | D904h | 302 | E01Ah |
| 56 | E026h | 118 | E058h | 180 | E064h | 241 | E085h | 302 | E08Ah | 303 | E08Ch |
| 57 | E0A8h | 119 | E0C1h | 181 | E128h | 242 | E184h | 303 | E1A0h | 304 | E1C0h |
| 58 | E209h | 120 | E222h | 182 | E2A0h | 243 | E304h | 304 | E380h | 305 | E409h |
| 59 | E40Ch | 121 | E444h | 183 | E620h | 244 | E80Ch | 305 | E881h | 306 | E908h |
| 60 | E980h | 122 | EA20h | 184 | EB00h | 245 | F009h | 306 | F00Ah | 307 | F022h |
| 61 | F024h | 123 | F030h | 185 | F104h | 246 | F208h | 307 | F280h | 308 | F440h |
| 62 | F480h | 124 | FC00h | | | | | | | | |

| INPUT (1 BIT) | OUTPUT ($D_{O15} \sim D_{O0}$) |
|---|---|
| 0 | B400h |
| 1 | CA00h |

FIG. 13

| NO | RANDOM DATA RESULTS ($r_{15} \sim r_0$) | SCRAMBLING RESULTS ($D_{O7} \sim D_{O0}$) | NO | RANDOM DATA RESULTS ($r_{15} \sim r_0$) | SCRAMBLING RESULTS ($D_{O7} \sim D_{O0}$) |
|---|---|---|---|---|---|
| 1 | 0001h | 01h | ~ | ~ | ~ |
| 2 | 0100h | 00h | 65534 | D0BDh | BDh |
| 3 | 0020h | 2Dh | 65535 | BD00h | 00h |
| 4 | 2D04h | 04h | 65536 | 0001h | 01h |
| 5 | 0451H | 51h | 65537 | 0100h | 00h |
| 6 | 51BDh | BDh | 65538 | 002Dh | 2Dh |
| 7 | BDADh | ADh | 65539 | 2D04h | 04h |
| 8 | AD13h | 13h | 65540 | 0451h | 51h |
| 9 | 13D3h | D3h | 65541 | 51BDh | BDh |
| ~ | ~ | ~ | 65542 | BDADh | ADh |

FIG. 14

| NO | RANDOM DATA RESULTS ($r_{15} \sim r_0$) | SCRAMBLING RESULTS ($D_{07} \sim D_{00}$) | NO | RANDOM DATA RESULTS ($r_{15} \sim r_0$) | SCRAMBLING RESULTS ($D_{07} \sim D_{00}$) |
|---|---|---|---|---|---|
|  |  |  | 65536 | 0001h | 01h |
| 1 | 0001h | 01h | 65537 | 0100h | 00h |
| 2 | 0100h | 00h | 65538 | 0053h | 53h |
| 3 | 002Dh | 2Dh | 65539 | 5311h | 11h |
| 4 | 2D04h | 04h | ~ | ~ | ~ |
| ~ | ~ | ~ | 131070 | ACEFh | EFh |
| 65532 | F85Ah | 5Ah | 131071 | EF00h | 00h |
| 65533 | 5AD0h | D0h | 131072 | 0001h | 01h |
| 65534 | D0BDh | BDh | 131073 | 0100h | 00h |
| 65535 | BD00h | 00h | 131074 | 002Dh | 2Dh |
|  |  |  | 131075 | 2D04h | 04h |

RANDOM DATA GENERATOR AND SCRAMBLER USING THE SAME, AND METHOD THEREFORE

CROSS-REFERENCE TO RELATED APPLICATIONS

This application claims the benefit of Korean Application No. 99-27886, filed Jul. 10, 1999, in the Korean Patent Office, the disclosure of which is incorporated herein by reference.

BACKGROUND OF THE INVENTION

1. Field of the Invention

The present invention relates to the field of data randomization, and more particularly, to a random data generator suitable for a high density optical disc system, and a scrambler using the random data generator, and method therefore.

2. Description of the Related Art

Random data generators, which are devices for converting the data of a particular input value into a random number, are being applied to scramblers of optical disc systems using optical discs such as a compact disc read only memory (CD-ROM) or a digital versatile disc (DVD).

Data scrambling is generally used to secure data from unauthorized users, and is a type of randomization which is being widely used for the purpose of secure communications.

The first essential reason for an optical disc system to scramble received data is to smoothly perform tracking control using differential phase detection (DPD). If the same data is received and thus the same modulated codes are recorded on adjacent tracks of a disc, a DPD signal is not detected upon reproduction, so that a servo unit cannot perform tracking control. For example, in the case of a CD-Audio which is not scrambled, the control of DPD is difficult in sections between tunes (that is, sections where all data is "00h").

The second reason is to reduce the burden of DC suppression control, which is performed by a modulator. In the case where identical data is continuously received, digital sum value (DSV) control itself may be impossible with respect to particular values. Hence, data randomization is needed to prevent such a worst case. Here, DSV is a parameter predicting the DC direction of a codeword stream, and a modulated codeword preferably has the code characteristics of not having a DC component.

The third reason is to protect particular data. In the case of a CD-ROM, only the remaining data except for a sync is scrambled to protect a sync pattern (00h, FFh, FFh, ..., FFh, 00h) within data.

Figure 1:
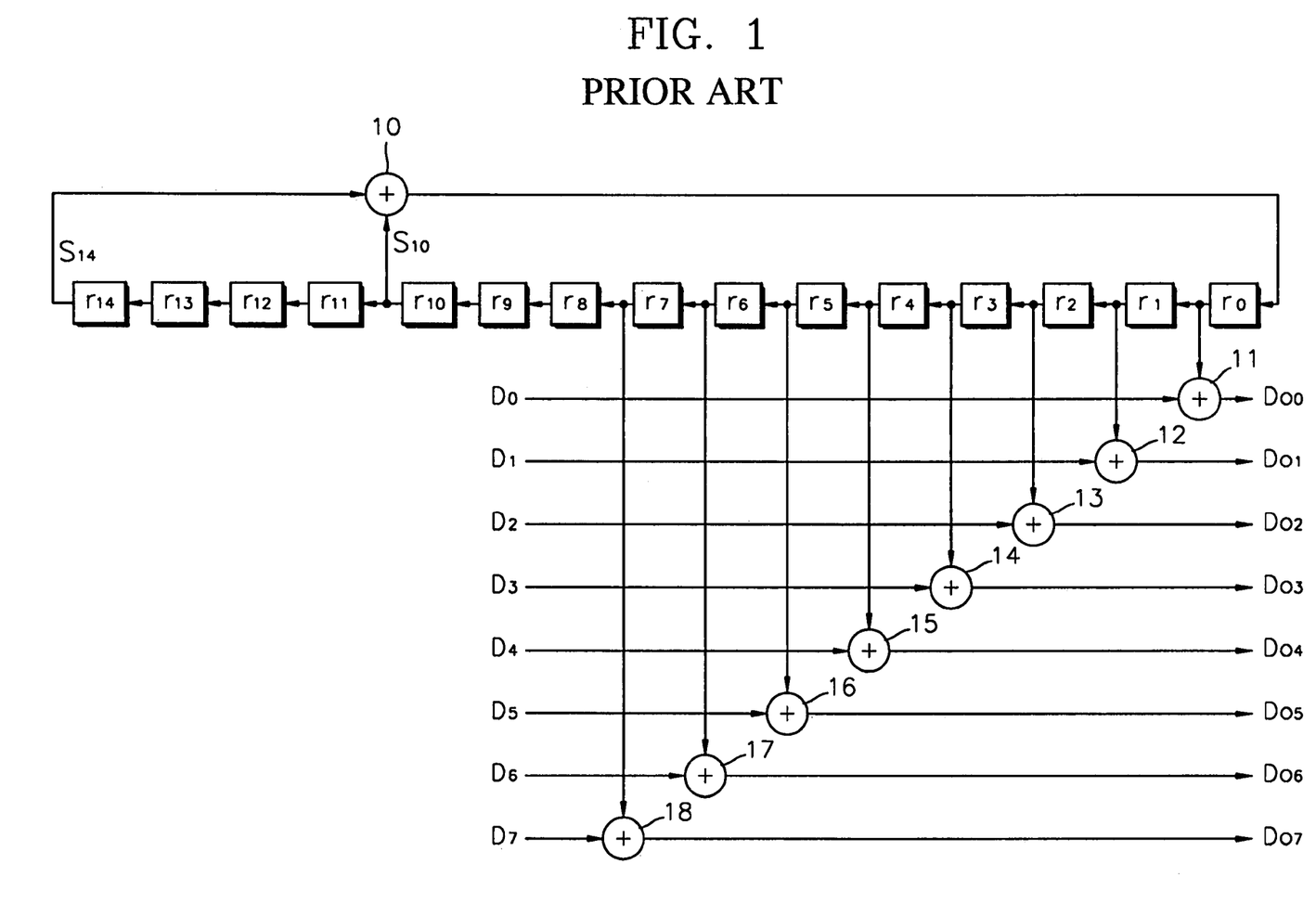
FIG. 1 is a circuit diagram of a random data generator used in a scrambler for a general digital versatile disc (DVD) system.

FIG. 1 is a circuit diagram of a scrambler of a general DVD system and which uses a random data generator, wherein an exclusive OR gate 10 and registers $r_0$ through $r_{14}$ for providing random data are referred to as a random data generator, and the random data generator and exclusive OR gates 11 through 18 are referred to as the scrambler.

In FIG. 1, though not shown, 15 bit registers $r_0$ through $r_{14}$ are shifted left in synchronization with the input of a clock signal to be scrambled. The input of the least significant register $r_0$ is a value obtained by performing an exclusive OR operation with respect to the outputs of the most significant register $r_{14}$ and the eleventh least significant register $r_{10}$, and is provided from the exclusive OR (XOR) gate 10.

The random data generation cycle in the random data generator shown in FIG. 1 is 32K (kilobytes), and is consistent with the size of one Error Correction Code (ECC) block of a DVD, 32K. That is, in the ECC block, a random value having no periodicity is generated, a register is shifted left eight times, and then the XOR gates 11 through 18 perform XOR operations with respect to the outputs of eight lower registers $r_0$ through $r_7$, and input data $D_0$ through $D_7$, whereby scrambled results are obtained. Here, though not shown, a data clock speed at which a data clock signal is input to the XOR gates 11 through 18 is ⅛ of a scramble clock speed at which a scramble clock signal is input to the registers $r_0$ through $r_{14}$.

Figure 2:
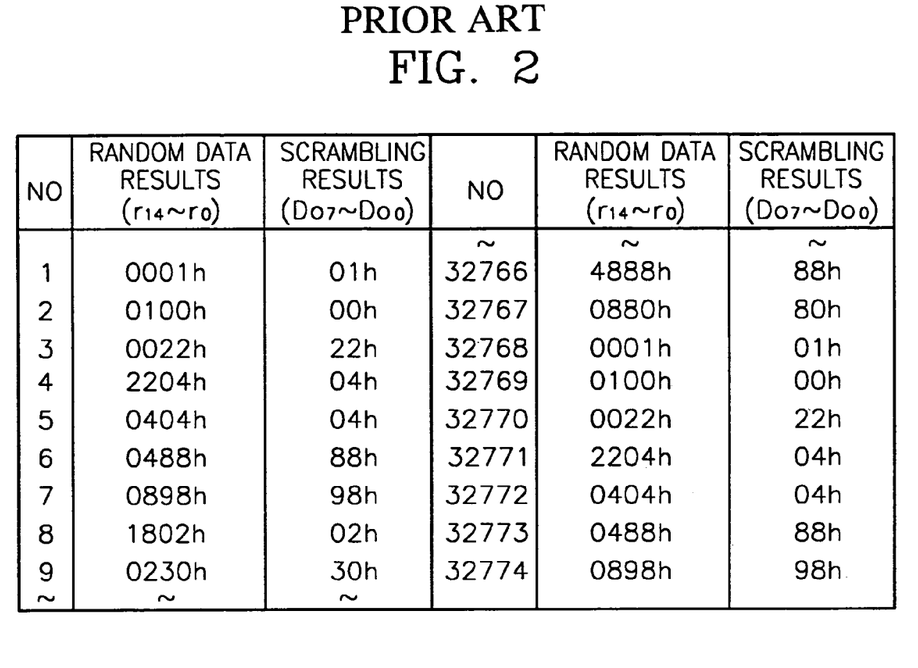
FIG. 2 is a table showing the results of random data generated by the random data generator shown in FIG. 1, and scrambling results when input data is "0"

FIG. 2 is a table for showing the random data results of the registers $r_0$ through $r_{14}$ and scrambling results $Do_0$ through $Do_7$ when the initial values of the registers $r_0$ through $r_{14}$ shown in FIG. 1 are set to be a hexadecimal number of "0001h" and input data $D_0$ through $D_7$ are "00h". It can be seen from FIG. 2 that the cycle of random data is 32K (32768).

Here, the values of the registers $r_0$ through $r_{14}$ are shifted left eight times, and then scrambling is performed. Accordingly, the registers $r_0$ through $r_{14}$ are initialized to initial values with reference to the four upper bits ID (7:4) within the last byte among a 4-byte identification code (ID) allocated to the head of a sector, which is a basic access unit. At this time, attention must be paid to select the initial values. That is, even if the same data is received, random data is generated from an initialized value within one sector, and values within the sector are equally repeated for a duration of 1 ECC block (16 sectors).

Figure 3:
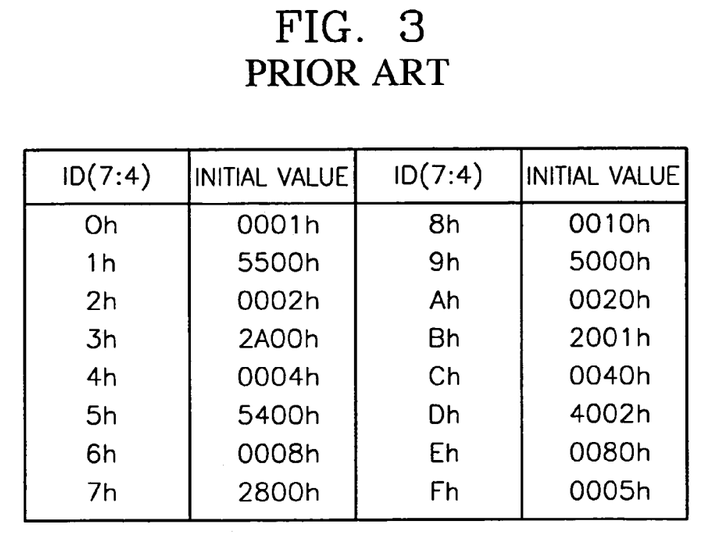
FIG. 3 is a table showing initial values used in the registers shown in FIG. 1.

As shown in FIG. 3, the initial values of the registers $r_0$ through $r_{14}$ includes the first initial value "000h" "0001h" and values 0002h, 0004h, 0008h, 0010h, 0020h, 0040h and 0080h obtained by shifting the value "0001h" left seven times, the value "5500h" of registers $r_0$ through $r_{14}$ after a capacity of at least 16K (=2 KH8) is required to return the 7 shifted values, and values 2A00h, 5400h, 2800h, 5000h, 2001h, 4002h and 0005h obtained by shifting the value "5500h" left up to seven times.

However, a conventional random data generator and a scrambler using the same cannot cope with when generation and scrambling of random data having a cycle greater than 32K are required.

SUMMARY OF THE INVENTION

To solve the above problem, an object of the present invention is to provide a random data generator having a serial structure, which can generate a large amount of data as random data.

Another object of the present invention is to provide a scrambler of a high-density optical disc system employing a random data generator having a serial structure.

Still another object of the present invention is to provide a random data generator having a parallel structure, which can generate a large amount of data as random data.

Yet another objective of the present invention is to provide a scrambler of a high-density optical disc system employing a random data generator having a parallel structure.

Additional objects and advantages of the invention will be set forth in part in the description which follows and, in part, will be obvious from the description, or may be learned by practice of the invention.

To achieve the first and other objects, the present invention provides a random data generator including: a m×2$^m$ table which receives m bits and outputs n bits; registers arranged in series which shift and store the n bits; selection output circuits which receive the n bits of output from the m×2$^m$ table as selection signals, and provides "0" with respect to valid bits among the n bits of output from the m×2$^m$ table and provides the outputs of the registers with respect to invalid bits; and logic circuits which perform XOR operations with respect to the n bits of output from the selection output circuits and the n bits of output from the registers, and feed the results of the XOR operations back to a least significant register only in the case of valid bits among the n bits of output from the m×2$^m$ table, wherein n bits of random data are generated from the registers.

To achieve the second and other objects, the random data generator having the serial structure is applied to the scrambler of a high-density optical disc system, and the scrambler comprises a random data generator and a predetermined number of logic gates which perform XOR operations with respect to input data and the outputs of as many lower registers as the predetermined number of logic gates to provide scrambling results.

To achieve the third and other objects, the present invention provides a random data generator including: p logic circuits arranged in parallel, which receive the outputs of n registers in parallel, perform XOR operations with respect to the outputs of the n registers which correspond to the results of left-shifting a number of times equal to the number of output data bits having correspondence to the number of effective branches according to a predetermined branch value, and provide 2$^m$ outputs; selection output circuits, each of which select one output among 2$^m$ outputs provided from each of the logic circuits according to m-bit selection signals, which provide p outputs; and n registers arranged in parallel which generate random data, wherein (n–p) upper registers receive the outputs of p lower registers and the p lower registers receive the p outputs of the selection output circuits. Here, the outputs of registers corresponding to the number of effective branches having a predetermined branch value are fed back to the corresponding logic circuits.

To achieve the fourth and other objects, the random data generator having the parallel structure is applied to a scrambler of a high-density optical disc system, and the scrambler comprises the random data generator and a predetermined number of logic gates which perform XOR operations with respect to input data and the outputs of as many lower registers as the predetermined number of logic gates to provide scrambling results.

BRIEF DESCRIPTION OF THE DRAWINGS

The above objects and advantage of the present invention will become more apparent by describing in detail preferred embodiments thereof with reference to the attached drawings in which:

FIG. 10 is a table showing the outputs of a 3×8 table in all possible cases when the cycle of random data is 64K in the random data generator shown in FIG. 5, and the number of effective branches is six;

DETAILED DESCRIPTION OF EMBODIMENTS

Reference will now made in detail to embodiments of the present invention, examples of which are illustrated in the accompanying drawings, wherein like reference numerals refer to the like elements throughout. The embodiments are described below in order to explain the present invention by referring to the figures.

Figure 4:
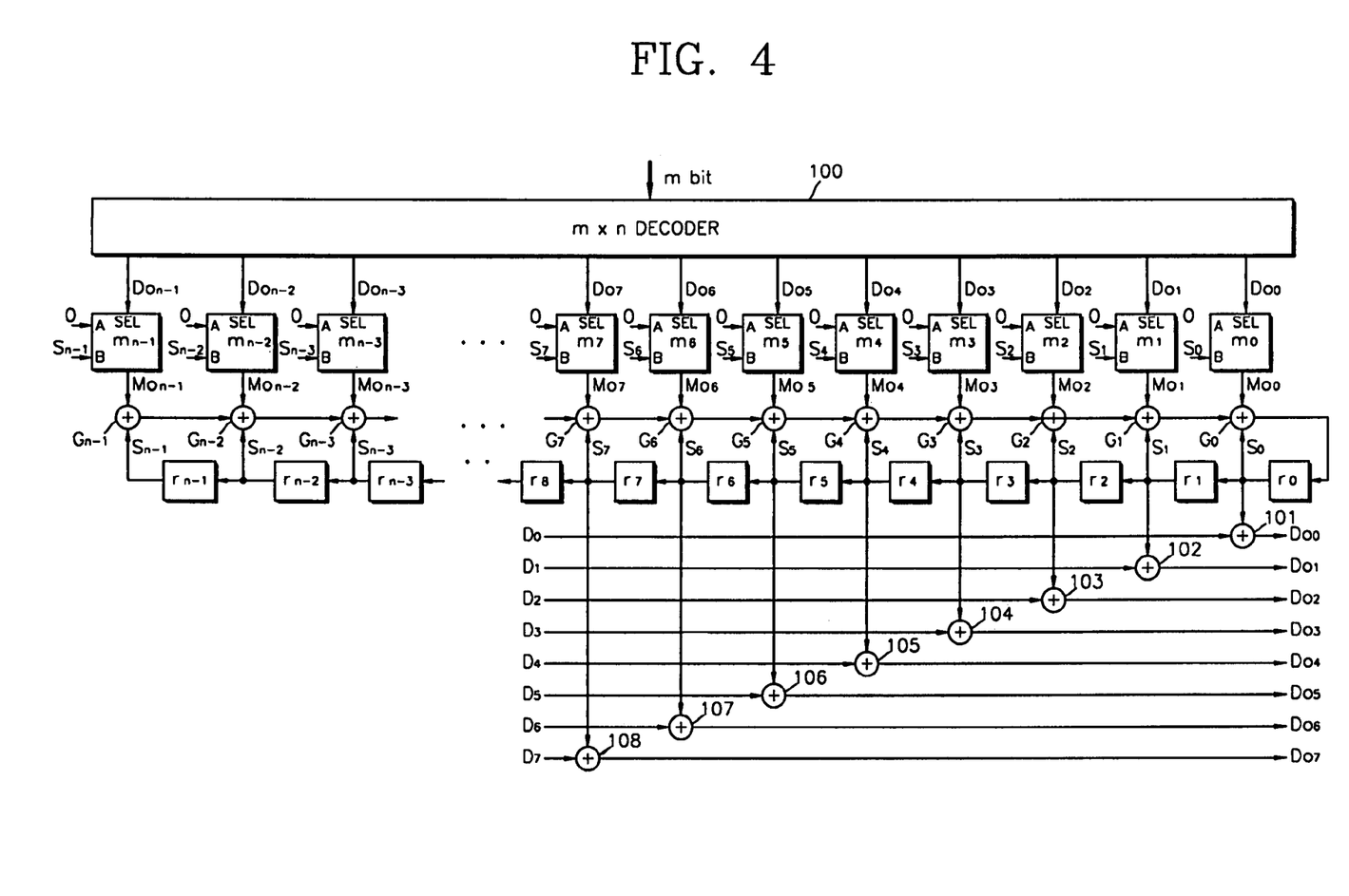
FIG. 4 is a scrambler using a circuit diagram of a random data generator having a serial structure according to an embodiment the present invention.

FIG. 4 is a circuit diagram of a scrambler using a random data generator having a serial structure according to the present invention. Here, the random data generator includes an m×2$^m$ table 100, n multiplexers $m_0$ through $M_{n-1}$, n XOR gates $G_0$ through $G_{n-1}$, and n registers $r_0$ through $r_{n-1}$, and the scrambler includes the random data generator having such a configuration and XOR gates 101 through 108 for performing XOR operations with respect to input data $D_0$ through $D_7$ and the outputs of registers $r_0$ through $r_7$, to output the results of scrambling. The n multiplexers can be referred to as selection output circuits for selecting and outputting either "0" or the output of each register in response to the n-bit output of the m×2$^m$ table 100, and the n XOR gates $G_0$ through $G_{n-1}$ can be referred to as logic circuits for providing the n-bit results of XOR operations. The m×2$^m$ table is, for example, a look up table (LUT) and may be embodied in a ROM memory to provide the desired outputs.

In FIG. 4, the m×2$^m$ table 100 receives m bits and outputs n bits. The n multiplexers $m_0$ through $m_{n-1}$ receive n output bits $Do_0$ through $Do_{n-1}$ as selection signals from the m×2$^m$ table 100, and provide "0", received via a first input port A, as output signals $Mo_0$ through $Mo_{n-1}$ to one side of each of the XOR gates $G_0$ through $G_{n-1}$ when the values of the n-bit outputs $Do_0$ through $Do_{n-1}$ of the m×2$^m$ table 100 are "1". At this time, the XOR gates $G_0$ through $G_{n-1}$ output the outputs $S_0$ through $S_{n-1}$ of the registers $r_0$ through $r_{n-1}$ received via the other sides thereof, without change, and finally the output of an accumulated XOR gate $G_0$ is fed back to the least significant register $r_0$.

Also, the n multiplexers $m_0$ through $m_{n-1}$ provide the outputs $S_0$ through $S_{n-1}$ of the registers $r_0$ through $r_{n-1}$ received via the second input port B, as output signals $Mo_0$ through $Mo_{n-1}$ to the XOR gates $G_0$ through $G_{n-1}$ when the values of the n output bits $Do_0$ through $Do_{n-1}$ of the m×2m table 100 are "0". The XOR gates $G_0$ through $G_{n-1}$ perform XOR operations with respect to the outputs $S_0$ through $S_{n-1}$ of the multiplexers $m_0$ through $m_{n-1}$, and the outputs $S_0$ through $S_{n-1}$ of the registers $r_0$ through $r_{n-1}$. Finally, the output of each of the XOR gates $G_0$ through $G_{n-1}$ becomes "0", so there are no values to be fed back to the least significant register $r_0$.

The n registers $r_0$ through $r_{n-1}$ generate n-bit random data, and the XOR gates 101 through 108 provide the scrambling results of XOR operations performed on input data $D_0$ through $D_7$ and the outputs of the 8 lower registers $r_0$ through $r_7$, to generate the outputs $So_1$ through $So_7$.

Figure 5:
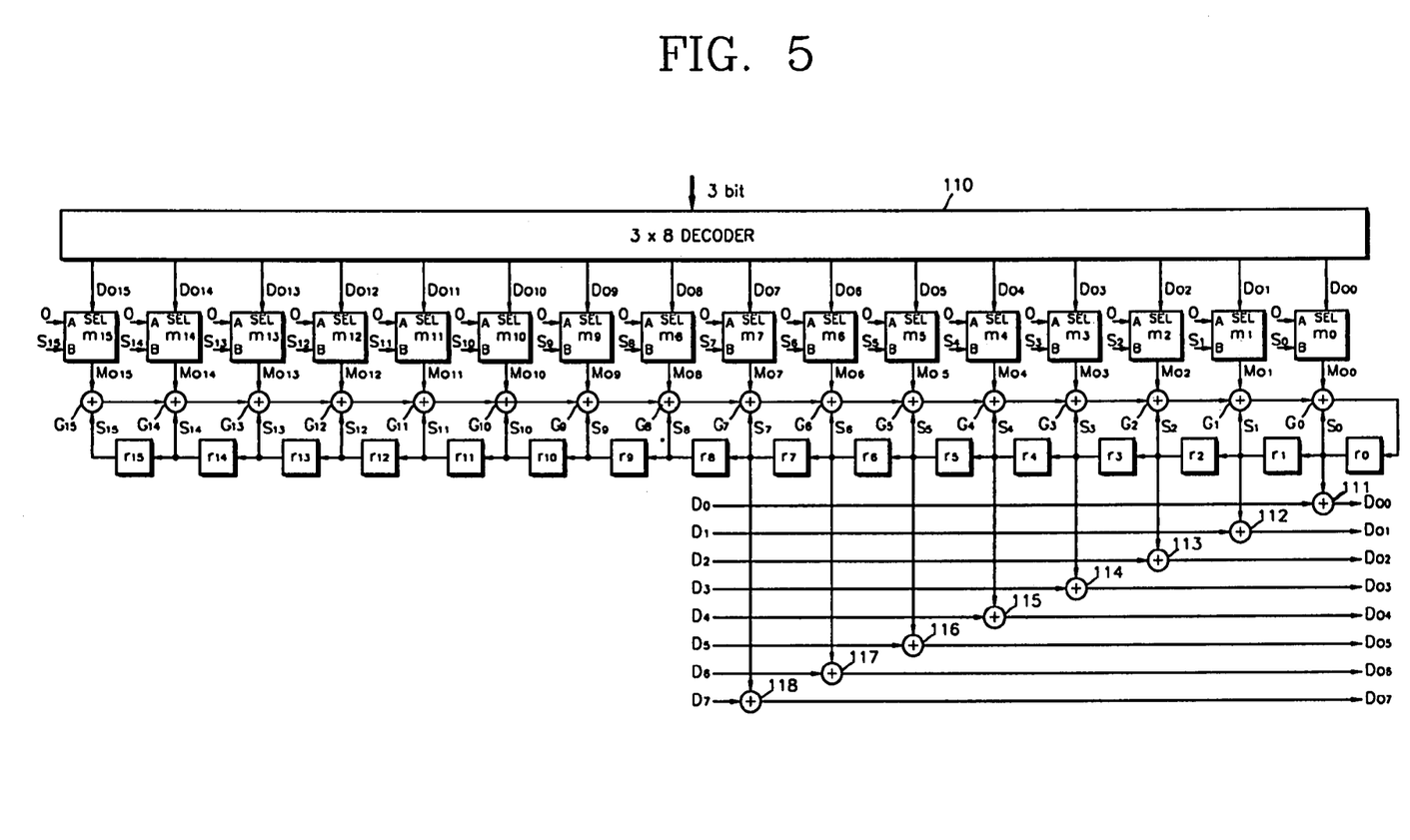
FIG. 5 is a circuit diagram of an embodiment of the scrambler using the random data generator shown in FIG. 4.
Figure 6:
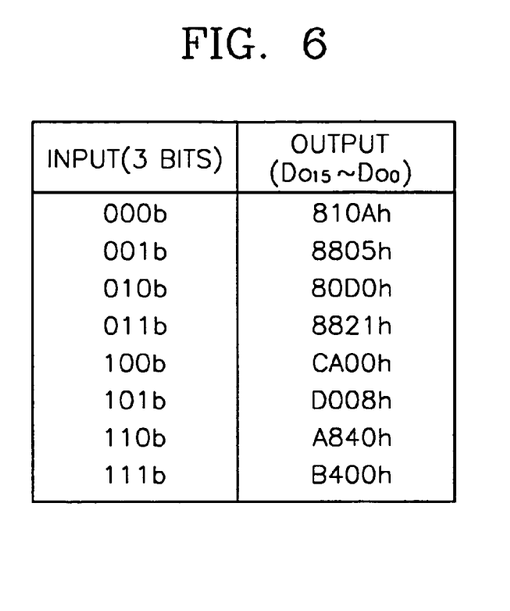
FIG. 6 is a table showing the inputs/outputs of a 3×8 table shown in FIG. 5.

FIG. 5 is a circuit diagram of an embodiment of the scrambler using the random data generator shown in FIG. 4. Here, the input to a 3×8 table 110 is set to be 3 bits, and the output therefrom is set to be 16 bits $Do_0$ through $Do_{15}$ which are output into 8 combinations. The 3×8 table has 8 different possible outputs, each of which is output as 16 bits, thereby requiring 16 output lines. Here "16" corresponds to "n". An example of the outputs according to the inputs of the 3×8 table 110 is shown in FIG. 6. In the example of FIG. 6, each of the output values $Do_{15}$ ~$Do_0$ of the table 110 is chosen in advance such that no duplication occurs when the values are shifted $2^{16}$ times.

If 3 bits having a value "100b" are received, the output value of the 3×8 table 110 is "CA00h" as shown in FIG. 6. Accordingly, only the outputs $Do_9$, $Do_{11}$, $Do_{14}$ and $Do_{15}$ of the 3×8 table 110 are "1", so the outputs $Mo_9$, $Mo_{11}$, $Mo_{14}$ and $Mo_{15}$ of the multiplexers $m_9$, $m_{11}$, $m_{14}$ and $m_{15}$ become "0". Hence, the XOR gates $G_9$, $G_{11}$, $G_{14}$ and $G_{15}$ provide the outputs $S_9$, $S_{11}$, $S_{14}$ and $S_{15}$ of the corresponding registers $r_9$, $r_{11}$, $r_{14}$ and $r_{15}$, received via the other side of each of the XOR gates $G_9$, $G_{11}$, $G_{14}$ and $G_{15}$, as their outputs, so that the output values of the upper XOR gates $G_9$, $G_{11}$, $G_{14}$ and $G_{15}$ are valid. The outputs of the remaining multiplexers $m_0, \ldots, m_8, m_{10}, m_{12}$ and $m_{13}$ are the outputs $S_0, \ldots, S_8, S_{10}, S_{12}$ and $S_{13}$ of the registers $r_0, \ldots, r_8, r_{10}, r_{12}$ and $r_{13}$, so that the corresponding XOR gates $G_0, \ldots, G_8, G_{10}, G_{12}$ and $G_{13}$ perform XOR operations with respect to the outputs $S_0, \ldots, S_8, S_{10}, S_{12}$ and $S_{13}$ of the multiplexers $m_0, \ldots, m_8, m_{10}, m_{12}$ and $m_{13}$, each of which is received via one side of each of the corresponding XOR gates, and the outputs $S_0, \ldots, S_8, S_{10}, S_{12}$ and $S_{13}$ of the registers $r_0, \ldots, r_8, r_{10}, r_{12}$ and $r_{13}$, each of which is received via the other end of each of the XOR gates $G_0, \ldots, G_8, G_{10}, G_{12}$ and $G_{13}$. The two sets of outputs $S_0, \ldots, S_{13}$ of the registers $r_0, \ldots, r_{13}$ and the multiplexers $m_0, \ldots, m_{13}$ are the same. As a result, the output values of the XOR gates $G_1, \ldots, G_9, G_{11}, G_{13}$ and $G_{14}$ become "0".

For example, in the case of the multiplexer $m_{13}$, the output $Do_{13}$ of the 3×8 table 110 is "0", so that the output $S_{13}$ of the register $r_{13}$ received via the second input port B is provided as its output $Mo_{13}$. Finally, the XOR gate $G_{13}$ performs a XOR operation with respect to the two data $S_{13}$ and $S_{13}$ and outputs "0", which means that the branches $S_{13}$ and $Mo_{13}$ of the XOR gate $G_{13}$ become invalid. Consequently, the scrambler using the random data generator and the scrambler using the same shown in FIG. 5 can have the structure shown in FIG. 7 if they are realized in a simple structure with respect to the output value "CA00h" of the 3×8 table 110.

Figure 7:
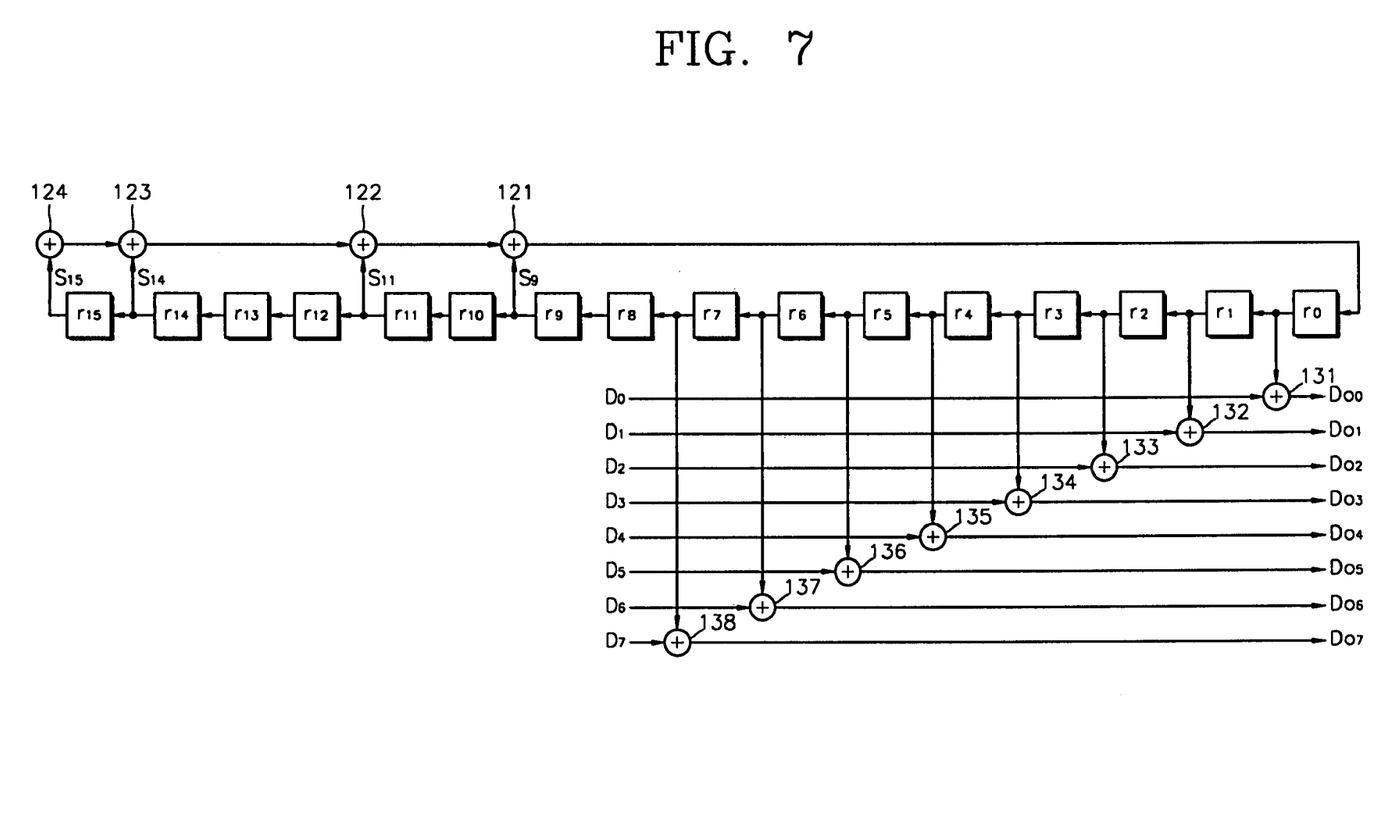
FIG. 7 is a circuit diagram of a scrambler using the random data generator when the output of the 3×8 table shown in FIG. 5 is, for example, "CA00h"
Figure 8:
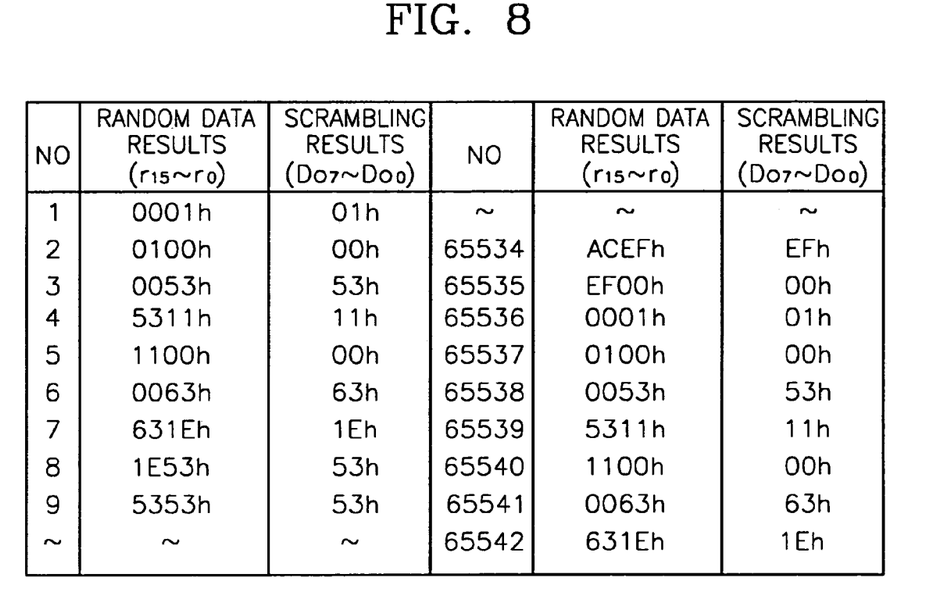
FIG. 8 is a table showing the results of random data generated by the random data generator shown in FIG. 7, and the results of scrambling by the scrambler of input data "00h"

As shown in FIG. 7, when the output value of the 3×8 table 110 shown in FIG. 5 is "CA00h", the registers $r_0$ through $r_{15}$ are shifted left eight times, and then random data is extracted. In this case, the random data of the registers $r_0$ through $r_{15}$ is as shown in FIG. 8, and it becomes evident that a cycle is 64K (65536).

The valid branches of the XOR gates $G_0$ through $G_{15}$ in the random data generator vary with the outputs of the 3×8 table 110 shown in FIG. 5, which changes the structure of the random data generator. Accordingly, generation of random data having an 8H64K cycle is enabled. This means that a random data generator for a long period can be realized with a structure of a type shown in FIG. 5 without limit. If the values of the 3×8 table 110 capable of generating random data having a 64K cycle are arranged in the structure shown in FIG. 5, tables of FIGS. 9 and 10 are obtained.

Figure 9:
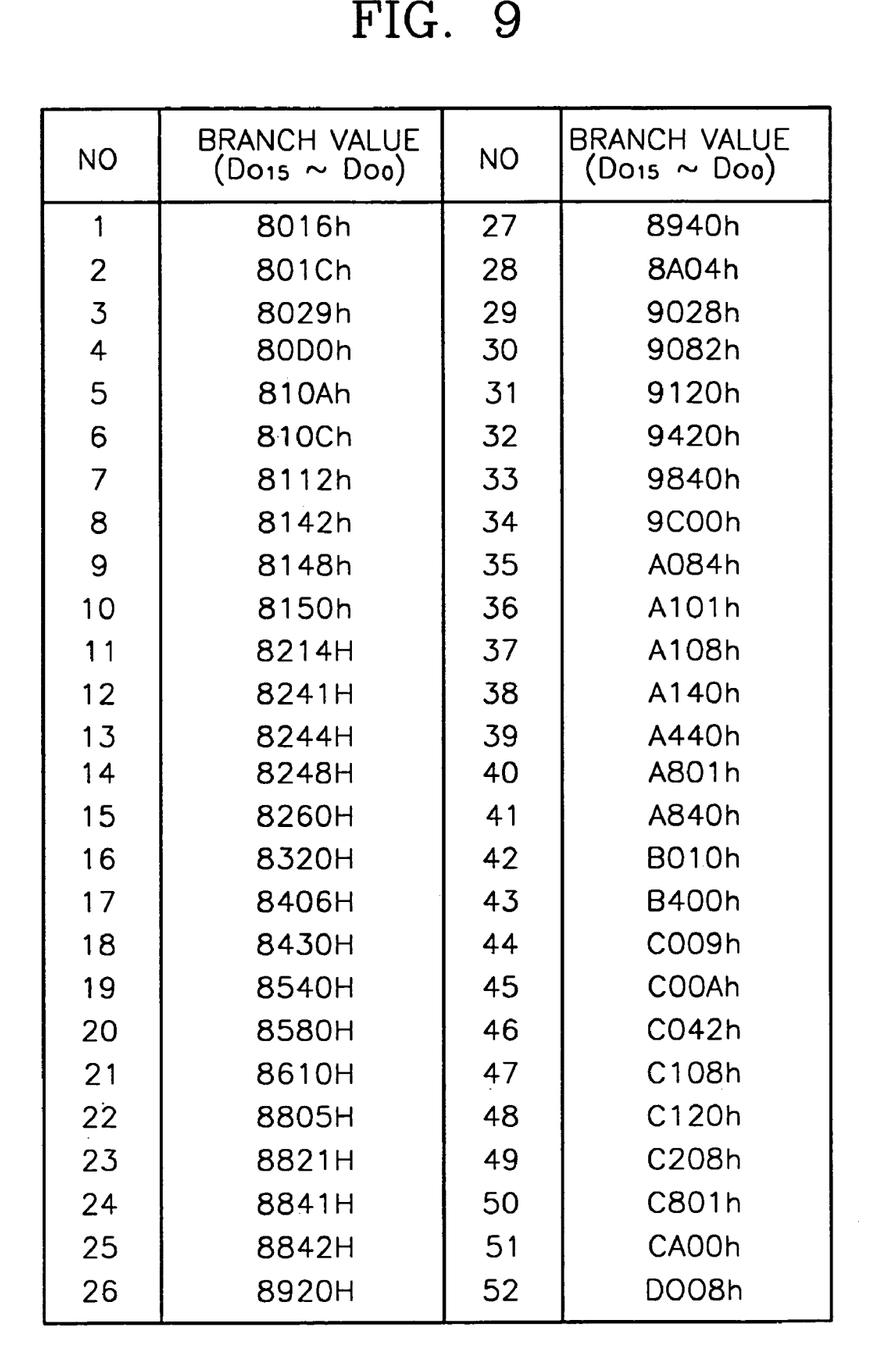
FIG. 9 is a table showing the outputs of a 3×8 table in all possible cases when the cycle of random data is 64K in the random data generator shown in FIG. 5, and the number of effective branches is four.

FIG. 9 is a table showing branch values in all possible cases, that is, the outputs $Do_0$ through $Do_{15}$ of the 3×8 table 110, when the number of XOR gates having effective branches of the XOR gates $G_0$ through $G_{15}$ in the random data generator shown in FIG. 5 is four. FIG. 10 is a table showing branch values in all possible cases, that is, the outputs $Do_0$ through $Do_{15}$ of the 3×8 table 110, when the number of XOR gates having effective branches of the XOR gates $G_0$ through $G_{15}$ in the random data generator shown in FIG. 5 is six. There may be the cases that the number of effective branches is 8, 10 or 12.

Thus, the cycle of random data is set to be 64K as an embodiment of the present invention, branch values capable of realizing this embodiment are proposed, and an m×2m table is provided as shown in FIG. 4 so as to extend the cycle of random data to $2^m$H64K.

Figure 11:
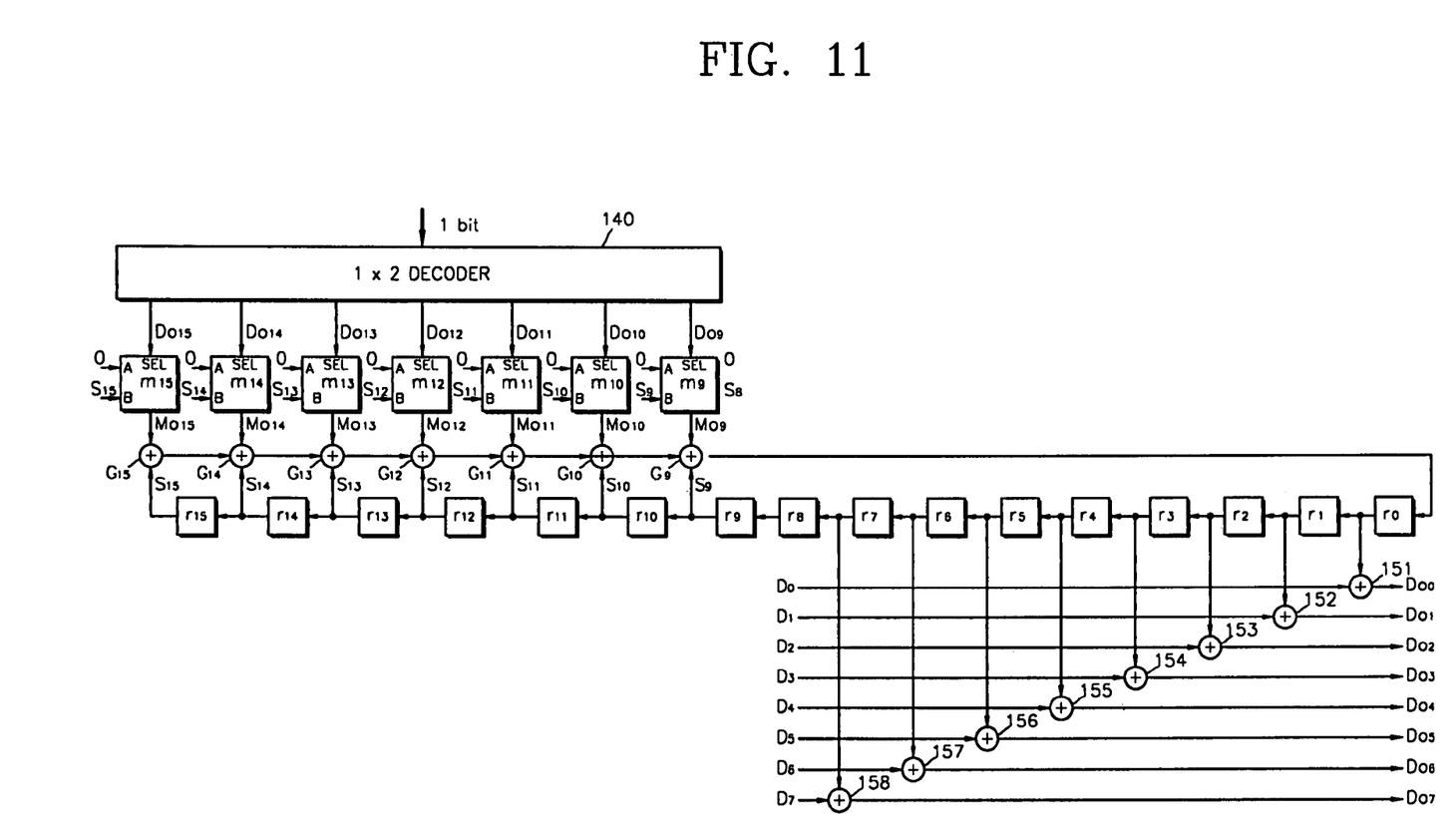
FIG. 11 is a circuit diagram of another embodiment of the present invention of the scrambler using random data generator shown in FIG. 4.

A circuit diagram of another embodiment of the scrambler using the random data generator shown in FIG. 4 is shown in FIG. 11. FIG. 11 shows a device for generating random data having a long cycle, which has a hardware structure that is as simple as possible.

Figure 12:
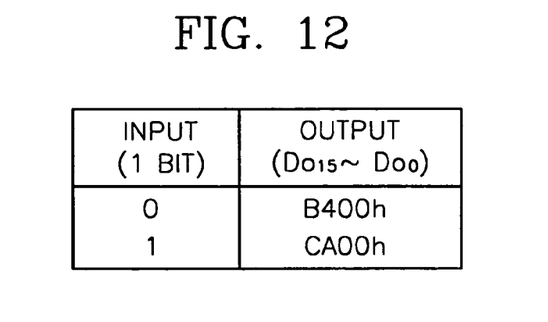
FIG. 12 is a table showing an example of the 1×2 table shown in FIG. 11.

In FIG. 11, "B400h" and "CA00h" having as many common parts as possible, among branch structures capable of a 64K random data cycle, are selected, and the contents of a 1×2 table 140 is shown in FIG. 12. The 1×2 table has two different possible outputs, each of which is output as 7 bits, thereby requiring 7 output lines. Branches corresponding to the outputs $Do_0$ through $Do_8$, which are commonly 0, of the 1×2 table 140 are all removed.

If one bit "0b" is applied to the 1×2 table 140, the output of the 1×2 table 140 becomes "B400h", and thus branches $Do_{14}$, $Do_{11}$, and $Do_9$ become invalid. Random data results provided from registers $r_0$ through $r_{15}$, and scrambling results $So_1$ through $So_7$ provided from XOR gates 151 through 158 when 8 bits of input data $Do_0$ through $Do_7$ are "00h", are arranged in a table and shown in FIG. 13.

Figure 13:
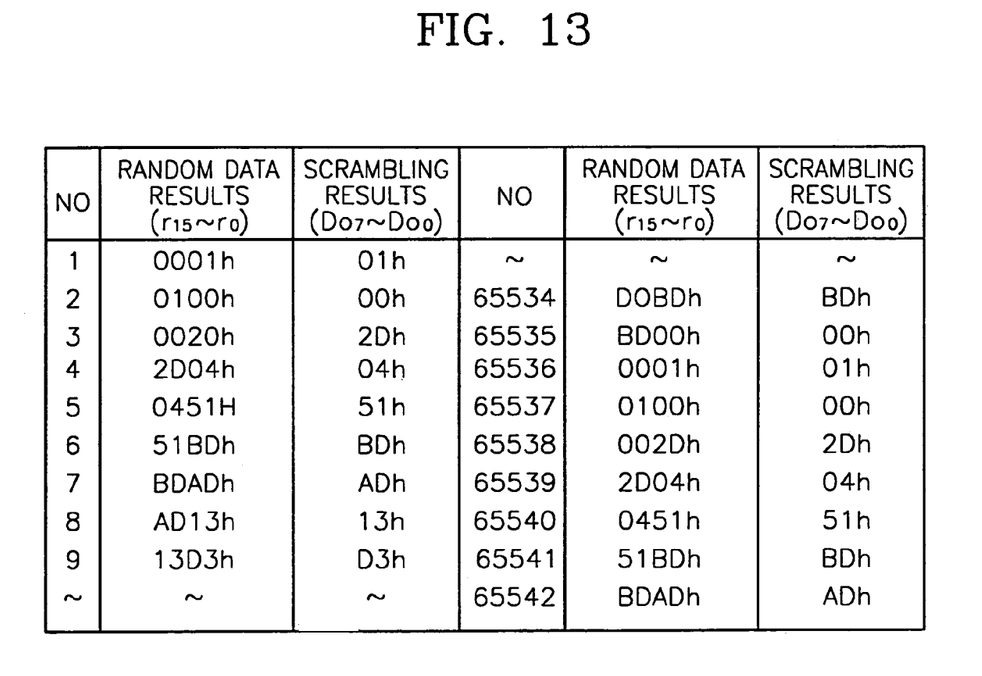
FIG. 13 is a table showing the results of random data when the output of the 1×2 table shown in FIG. 11 is "B400h", and the results of scrambling of input data "00h"

Hence, the table shown in FIG. 13 has random data extracted whenever the registers $r_0$ through $r_{15}$ are shifted left eight times, and indicates that one cycle is 64K (65536). Consequently, the results $So_0$ through $So_7$ obtained by scrambling the input data $D_0$ through $D_7$ become data intended to be finally used.

On the other hand, if one bit "1b" is applied to the 1×2 table 140 shown in FIG. 11, the output of the 1×2 table 140 becomes "CA00h". Random data results $So_0$ through $So_7$ provided from registers $r_0$ through $r_{15}$, and scrambling results provided from XOR gates 151 through 158 when 8 bits of input data $D_0$ through $D_7$ are "00h", are the same as the contents of FIG. 8.

Figure 14:
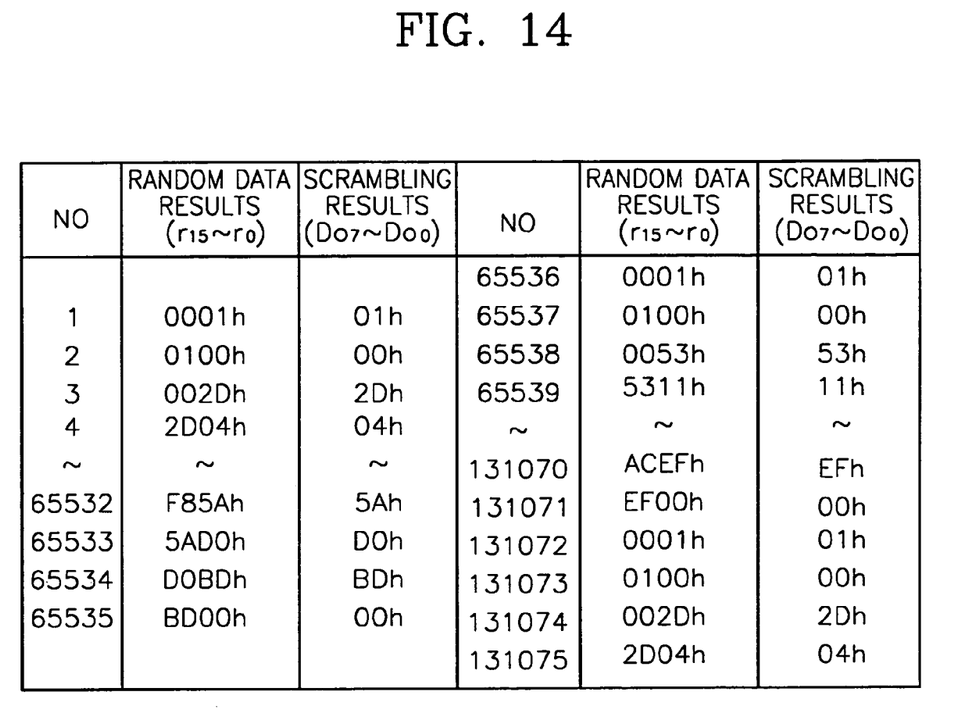
FIG. 14 is a table showing the results of random data when "B400h" and "CA00h" are used as the outputs of the 1×2 table shown in FIG. 11, and the results of scrambling of input data "00h"

Thus, the results of random data that can be obtained by the structure shown in FIG. 11, and the results of scrambling of input data "00h", are arranged in a table and shown in FIG. 14. Here, the cycle can be simply extended to 2H64K.

Figure 15:
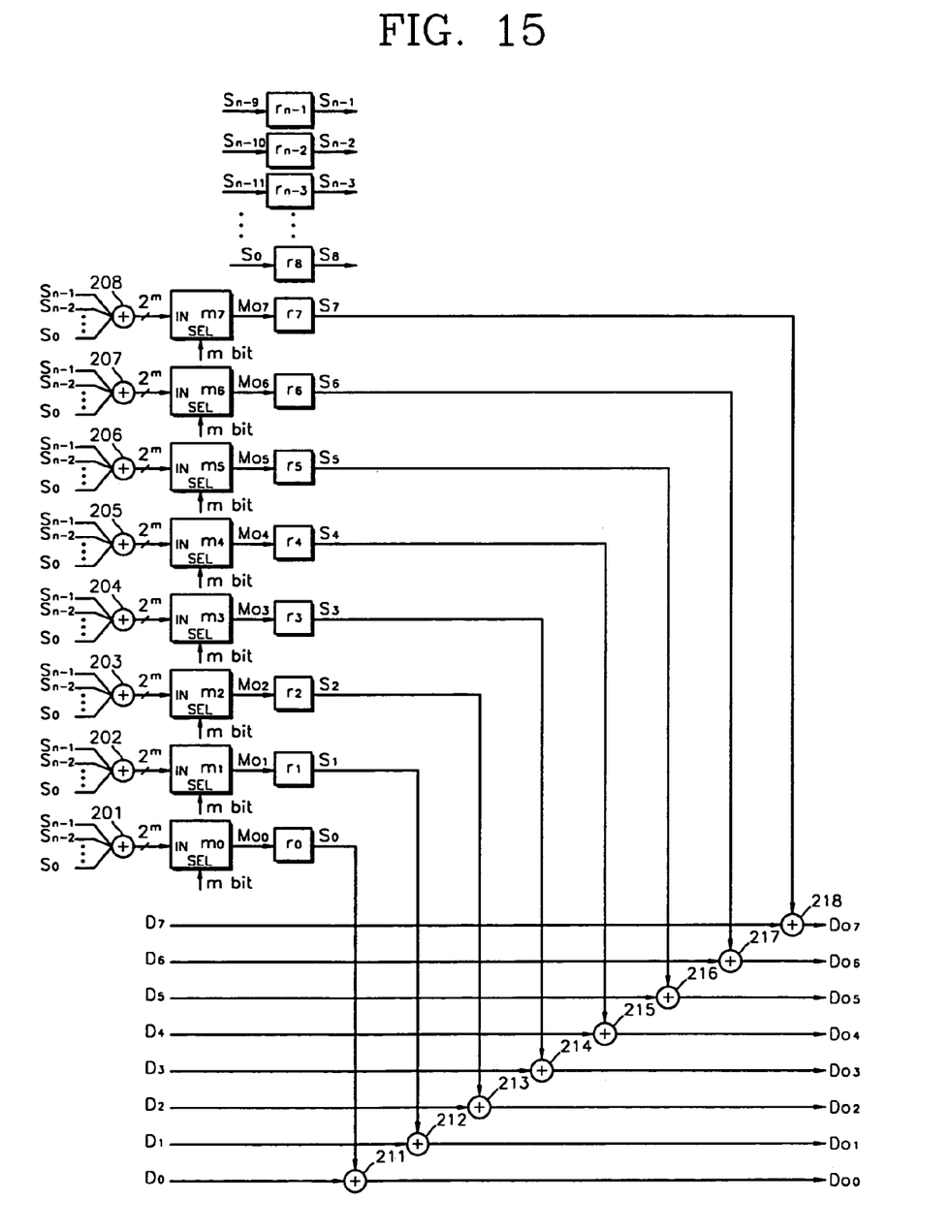
FIG. 15 is a circuit diagram of a scrambler using a random data generator having a parallel structure according to another embodiment of the present invention.

FIG. 15 shows a scrambler using a random data generator having a parallel structure according to another embodiment of the present invention. The structures of the scrambler and the random data generator are preferable for systems requiring high-speed signal processing.

In the structure shown in FIG. 15, the results shifted left eight times are directly applied to each of the registers $r_0$ through $r_{n-1}$ in parallel, so that the outputs $S_0$ through $S_{n-1-8}$ of the registers $r_0$ through $r_{n-1-8}$ are applied to upper registers $r_8$ through $r_{n-1}$. The input of the lower registers $r_0$ through $r_7$ depends on which branch structure is selected among the branch structures shown in FIGS. 9 and 10. Also, the number of lower registers $r_0$ through $r_7$ shown is 8, but can vary with an input data bit (p).

Multiplexers $m_0$ through $m_7$ each select one input among $2^m$ inputs provided via XOR gates 201 through 208 according to m-bit selection signals, and provide the selected input to corresponding registers $r_0$ through $r_7$. Here, the XOR gates 201 through 208 are a combination of several XOR gates. The XOR gates 211 through 218 perform XOR operations of the outputs $S_0, \ldots, S_7$ and inputs $D_0, \ldots, D_6$, respectively, so that they output the final scrambling results $So_0, \ldots, So_7$.

Figure 16:
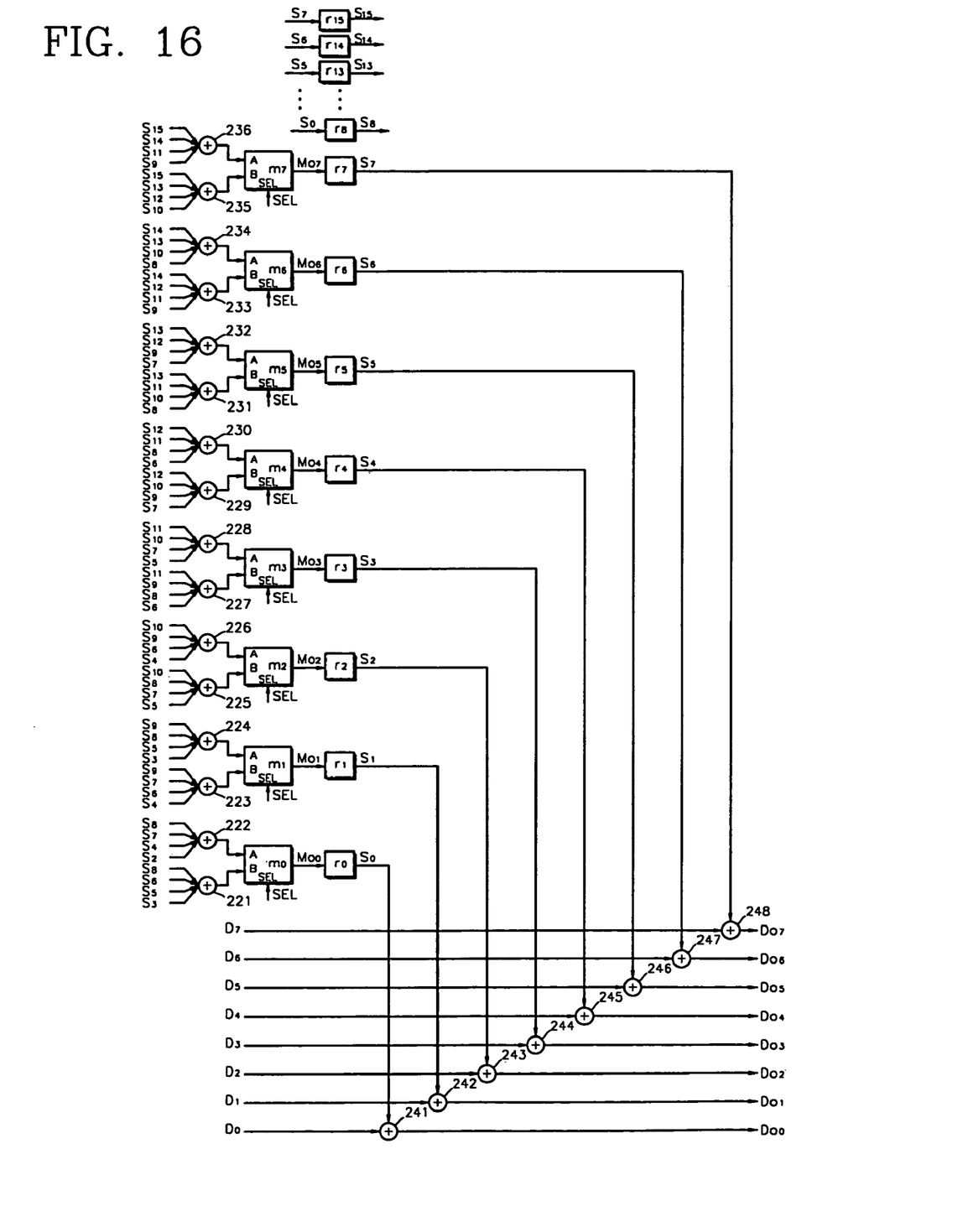
FIG. 16 is a circuit diagram of an embodiment of the present invention in which a scrambler uses the random data generator and the scrambler using the same shown in FIG. 15.

A circuit diagram of another embodiment of the serial-type random data generator and the scrambler using the same shown in FIG. 11, that is, a transformation of a serial type random data generator and a scrambler using the same into a parallel type, is shown in FIG. 16.

In FIG. 16, when a selection signal SEL of each of the multiplexers $m_0$ through $m_7$ corresponding to the output "CA00h" of the 1×2 table 140 shown in FIG. 11 is "1", the same contents as the contents of the registers $r_0$ through $r_{15}$ which were shifted left eight times in FIG. 11 are applied in parallel as follows.

That is, the outputs $S_0$ through $S_7$ of the registers $r_0$ through $r_7$ are input to the registers $r_8$ through $r_{15}$ arranged in parallel. The XOR gates 211 through 236 perform XOR operations, and the results of $(S_8 \oplus S_7 \oplus S_4 \oplus S_2)$, $(S_9 \oplus S_8 \oplus S_5 \oplus S_3)$, $(S_{10} \oplus S_9 \oplus S_6 \oplus S_4)$, $(S_{11} \oplus S_{10} \oplus S_7 \oplus S_5)$, $(S_{12} \oplus S_{11} \oplus S_8 \oplus S_6)$, $(S_{13} \oplus S_{12} \oplus S_9 \oplus S_7)$, $(S_{14} \oplus S_{13} \oplus S_{10} \oplus S_8)$ and $(S_{15} \oplus S_{14} \oplus S_{11} \oplus S_9)$ are applied to the registers $r_0$ through $r_7$ via the first input port A of each of the multiplexers $m_0$ through $m_7$, respectively.

Also, when the selection signal SEL of each of the multiplexers $m_0$ through $m_7$ corresponding to the output "B400h" of the 1×2 table 140 shown in FIG. 11 is "0", the outputs $S_0$ through $S_7$ of the registers $r_0$ through $r_7$ are input to the registers $r_8$ through $r_{15}$, respectively, and the results of $(S_8 \oplus S_6 \oplus S_5 \oplus S_3)$, $(S_9 \oplus S_7 \oplus S_6 \oplus S_4)$, $(S_{10} \oplus S_8 \oplus S_7 \oplus S_5)$, $(S_{11} \oplus S_9 \oplus S_8 \oplus S_6)$, $(S_{12} \oplus S_{10} \oplus S_9 \oplus S_7)$, $(S_{13} \oplus S_{11} \oplus S_{10} \oplus S_8)$, $(S_{14} \oplus S_{12} \oplus S_{11} \oplus S_9)$ and $(S_{15} \oplus S_{13} \oplus S_{12} \oplus S_{10})$ are applied to the registers $r_0$ through $r_7$ via the second input port B of each of the multiplexers $m_0$ through $m_7$, respectively.

The random data results provided from the registers $r_0$ through $r_{15}$, and the scrambling results $So_0$ through $So_7$ when the input data $D_0$ through $D_7$ provided from XOR gates 241 through 248 are "00b", are the same as those shown in a table of FIG. 14.

In the serial structure shown in FIG. 11, random data results and scrambling results are obtained after shifting each of the registers $r_0$ through $r_{15}$ left eight times, and a scramble clock signal provided to each of the registers $r_0$ through $r_{15}$ must be eight times as fast as a data clock signal provided to the XOR gates 151 through 158. Whereas, in the parallel structure of FIG. 16, the same results as those shown in FIG. 11 can be obtained even with one shift, a scramble clock signal provided to each of the registers $r_0$ through $r_{15}$ is as fast as a data clock signal provided to the XOR gates 241 through 248, and thus, a scramble clock signal having the same speed as the speed of the data clock signal of the serial structure can be used.

Accordingly, the serial structure shown in FIG. 11 is simpler than a parallel structure, but may have a disadvantage in that it must operate fast. The parallel structure shown in FIG. 16 operates at a speed of ⅛ of the operating speed of the serial structure, but may have a disadvantage in that the circuit is somewhat more complicated. Thus, they can be selected according to the circumstances.

According to the present invention, random data having a cycle of 64K or greater can be generated, and a random data generator for $2^m$H64K can be realized with an m×2m table. Also, the present invention can be used as a random data generator for a scrambler of a high-capacity optical disc system such as an anticipated high density (HD)-DVD.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A random data generating apparatus which receives m bits, comprising:
   a first random data generator comprising:
   an m×$2^m$ look up table which receives m bits and outputs n bits,
   selection output circuits which receive the n bits output from the m×$2^m$ look up table as selection signals, and which provide a predetermined value with respect to valid bits among the n bits output from the m×$2^m$ look up table and provide respective bits of feedback bits with respect to invalid bits among the n bits output from the m×$2^m$ look up table, to generate selected n bits;
   logic circuits which perform XOR operations on the selected n bits from the selection output circuits and respective ones of feedback bits; and
   registers arranged in series which shift values output from a least significant one of the logic circuits to generate the feedback bits,
   wherein the logic circuits feed the results of the XOR operations back to a least significant one of the registers only in a case of valid bits among the n bits output from the m×$2^m$ look up table; and
   wherein the registers output the feedback bits as random data.

2. The apparatus of claim 1, wherein the m×$2^m$ look up table outputs $2^m$ combinations of the output n bits with respect to the input m bits, thereby extending a cycle of the random data to $2^m$ times.

3. The apparatus of claim 1, wherein when the n bits output from the m×$2^m$ look up table is set to be 16 and a predetermined branch value is selected, a cycle of the random data becomes $2^{16}$ (=approximately 64K).

4. The apparatus of claim 1, wherein, in response to the selection output circuits receiving m-bit selection signals and 16 of the selected n bits are output, the m×2$^m$ look up table becomes an m×16 look up table, and a cycle of the random data is 2$^m$×64K.

5. The apparatus of claim 1, wherein the m×2$^m$ look up table is a 3×8 ROM table, and a cycle of the random data is 8×64K.

6. The apparatus of claim 1, wherein the m×2$^m$ look up table is a 1×2 ROM table, and a cycle of the random data is 2×64K.

7. The apparatus of claim 1, wherein a number of effective branches of outputs of the m×2$^m$ look up table is at least 4.

8. The apparatus of claim 7, wherein the number of effective branches is determined by designated branch values.

9. The apparatus of claim 1, further comprising:
a scrambler of an optical disc system, comprising
a second random data generator having a predetermined number of logic gates,
wherein the predetermined number of logic gates perform XOR operations on input data and outputs of as many lower ones of the feedback bits from the registers as the predetermined number of logic gates, to provide scrambling to input data according to the random data output from the registers.

10. The random data generating apparatus of claim 9, wherein a scramble clock signal provided to each of the registers is approximately 8 times as fast a data clock signal provided to the predetermined number of logic gates.

11. The random data generating apparatus of claim 1, wherein the registers shift the least significant one of the selected n bits eight times to the left, and indicate that one cycle is at least 64K.

12. A random data generating apparatus to generate random data according to an input of m bits, comprising:
a table to selectively output n bits as valid and invalid bits in response to the m bits;
selection circuits which select a predetermined value or a respective feedback bit, to generate selection signals; and
logic circuits arranged in serial, which perform XOR operations on the selection signals, the respective feedback bits, and an output of an adjacent more significant one of the logic circuits; and
n registers arranged in serial which shift values output from a least significant one of the logic circuits to generate the respective feedback bits.

13. The random data generating apparatus of claim 12, wherein the random data has a cycle of 2$^m$×64K.

14. The random data generating apparatus of claim 12, wherein the random data has a cycle of at least 64K.

15. A random data generating apparatus to generate random data for use in an optical disc system, comprising:
a table which outputs n bits in response to an input m bits;
multiplexers arranged to receive n bits output from the table, to provide a predetermined value with respect to valid bits among the n bits output from the table and to provide respective feedback bits with respect to invalid bits among the n bits output from the table; and
a feedback circuit including logic gates arranged to perform XOR operations on selected n bits from the multiplexers and the respective feedback bits, and shift registers arranged in series to shift values output from a least significant one of the logic gates and generate the feedback bits, wherein the logic gates output of a last one of the XOR operations to a least significant one of the shift registers, and wherein the shift registers generate the feedback bits as random data after a predetermined number of shifts.

16. A random data generating method of generating random data according to an input of m bits, comprising:
selectively outputting n bits as valid and invalid bits in response to the m bits;
selecting a predetermined value or a respective feedback bit, to generate selection signals corresponding to each of the n bits;
performing XOR operations on the selection signals, the respective feedback bits, and an output of an adjacent more significant one of the logic circuits;
feeding the output of the XOR operation associated with a least significant of the selection signals to a least significant one of the feedback bits; and
shifting the least significant one of the feedback bits n−1 times to generate all the feedback bits.

17. The random data generating method of claim 16, wherein the random data has a cycle of 2$^m$×64K.

18. The random data generating method of claim 16, wherein the random data has a cycle of at least 64K.

19. The random data generating method of claim 18, wherein the random data has a cycle of 2$^m$×64K.

* * * * *

UNITED STATES PATENT AND TRADEMARK OFFICE
CERTIFICATE OF CORRECTION

PATENT NO. : 7,092,979 B1  Page 1 of 1
APPLICATION NO. : 09/613310
DATED : August 15, 2006
INVENTOR(S) : Jae-seong Shim It is certified that error appears in the above-identified patent and that said Letters Patent is hereby corrected as shown below:

On The Title Page: Item (57) Abstract, line 3, change "decoder" to -- table --

(57) Abstract, line 6, change "decoder" to -- table --

(57) Abstract, line 8, change "decoder" to -- table --

(57) Abstract, line 11, change "decoder" to -- table --

(57) Abstract, line 17, change "decoder" to -- table --

Signed and Sealed this

Thirteenth Day of February, 2007

JON W. DUDAS
*Director of the United States Patent and Trademark Office*